Figure 1:
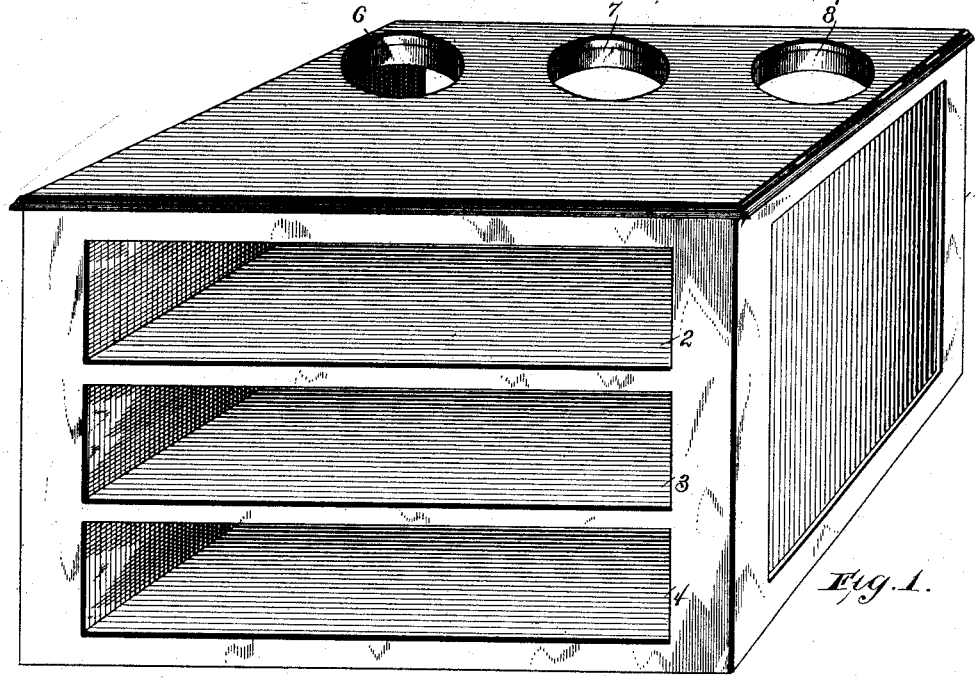

(No Model.) 9 Sheets—Sheet 1.

G. B. & E. R. PETERS.
MANUAL RECORDER.

No. 506,720. Patented Oct. 17, 1893.

Witnesses
Louis G. Julihn
Eric G. Julihn

Inventors
G. B. & E. R. Peters
By Hapkins and Atkins
Attorneys (No Model.) 9 Sheets—Sheet 2.

G. B. & E. R. PETERS.
MANUAL RECORDER.

No. 506,720. Patented Oct. 17, 1893.

Witnesses
Louis G. Julihn.
Eric G. Julihn.

Inventors
G. B. & E. R. Peters
By Hopkins and Atkins
Attorneys (No Model.)
9 Sheets—Sheet 3.
G. B. & E. R. PETERS.
MANUAL RECORDER.
No. 506,720.
Patented Oct. 17, 1893.
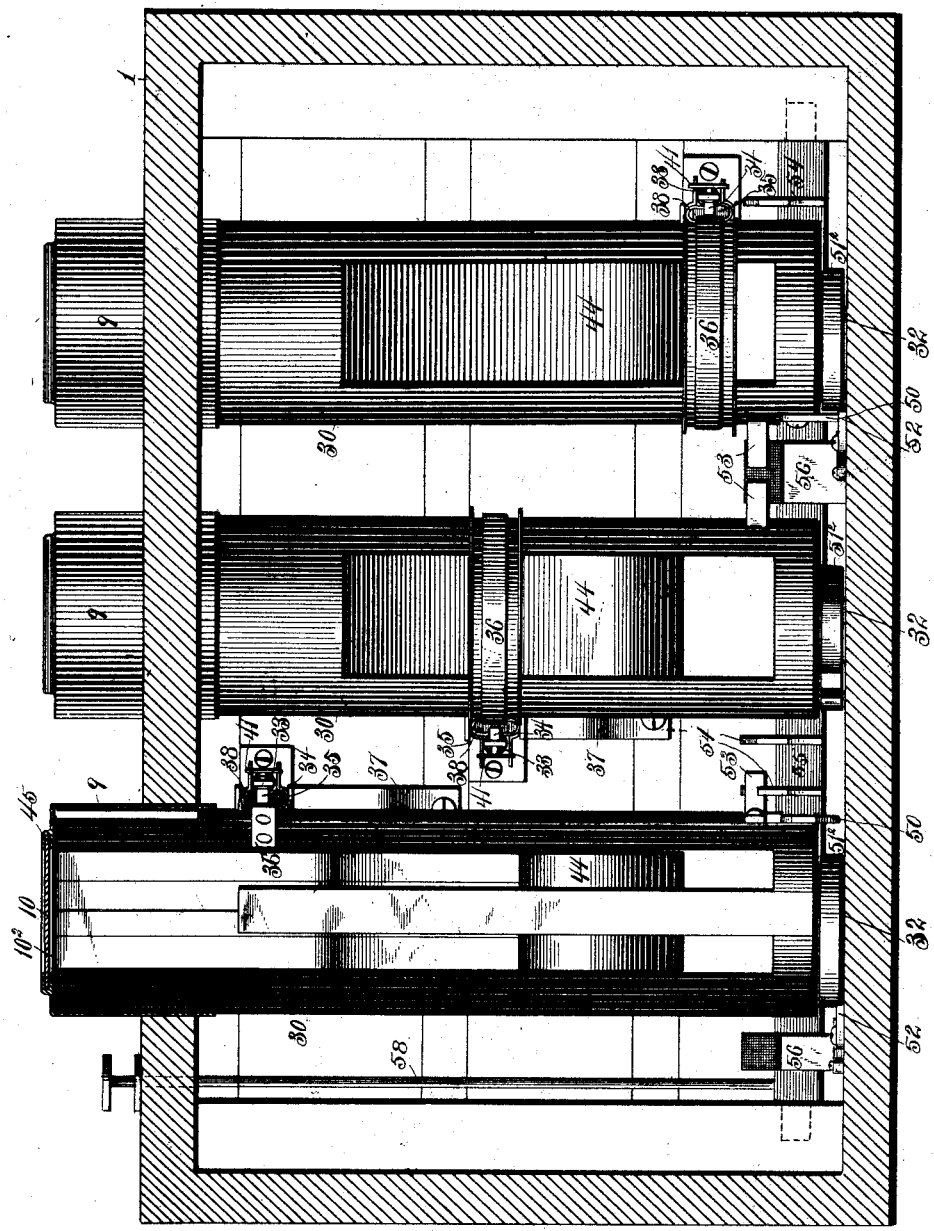
Witnesses
Louis F. Julihn.
Eric G. Julihn.
Inventors
G. B. & E. R. Peters
By Hapkins and Atkins
Attorneys

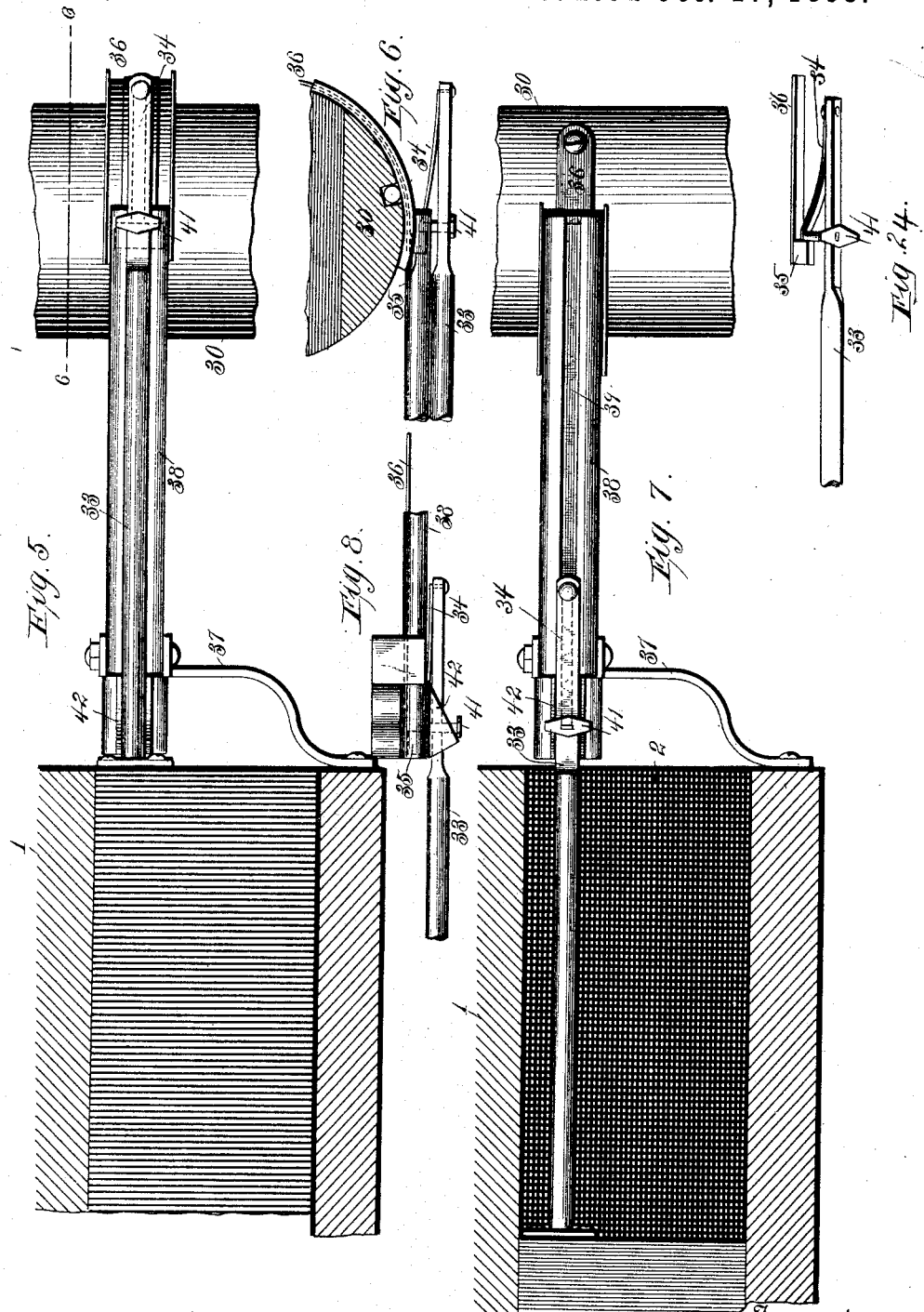

(No Model.) 9 Sheets—Sheet 5.

G. B. & E. R. PETERS.
MANUAL RECORDER.

No. 506,720. Patented Oct. 17, 1893.

Witnesses
Louis G. Julihn.
Eric G. Julihn.

Inventors
G. B. & E. R. Peters
By Hopkins and Atkins
Attorneys (No Model.) 9 Sheets—Sheet 6.

G. B. & E. R. PETERS.
MANUAL RECORDER.

No. 506,720. Patented Oct. 17, 1893.

Witnesses

Inventors
G. B. & E. R. Peters
By Hopkins and Atkins
Attorneys (No Model.) 9 Sheets—Sheet 7.

G. B. & E. R. PETERS.
MANUAL RECORDER.

No. 506,720. Patented Oct. 17, 1893.

Witnesses
Louis F. Julihn
Eric G. Julihn

Inventors
G. B. and E. R. Peters
By Hopkins and Atkins
Attorneys (No Model.) 9 Sheets—Sheet 8.
G. B. & E. R. PETERS.
MANUAL RECORDER.
No. 506,720. Patented Oct. 17, 1893.
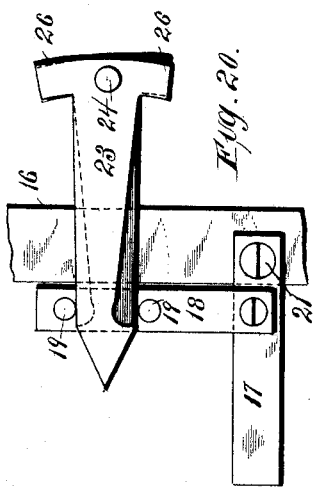
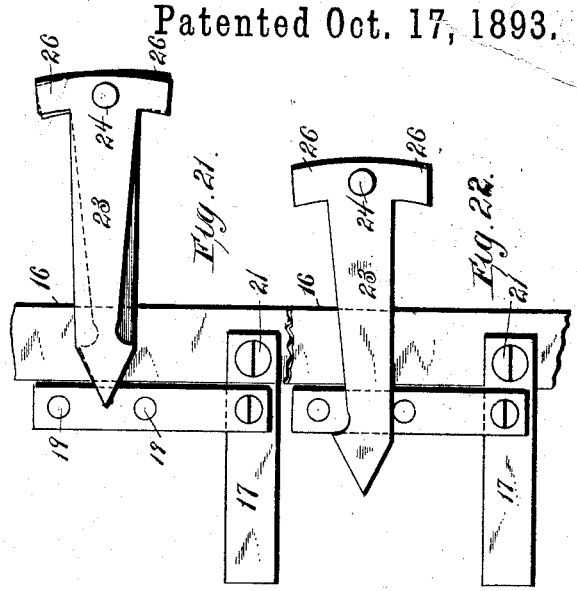
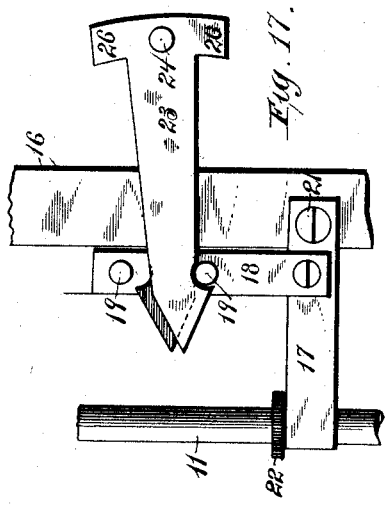
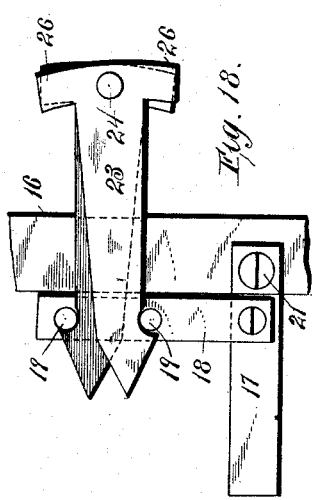
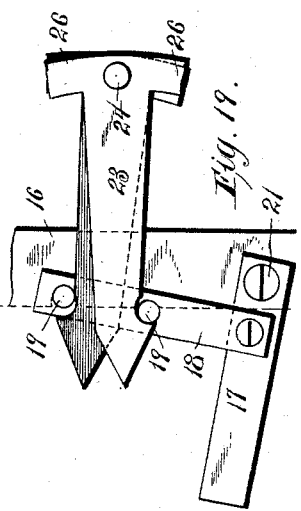
Witnesses
Louis F. Julihn
Eric G. Julihn
Inventors
G. B. and E. R. Peters
By Hopkins and Atkins
Attorneys

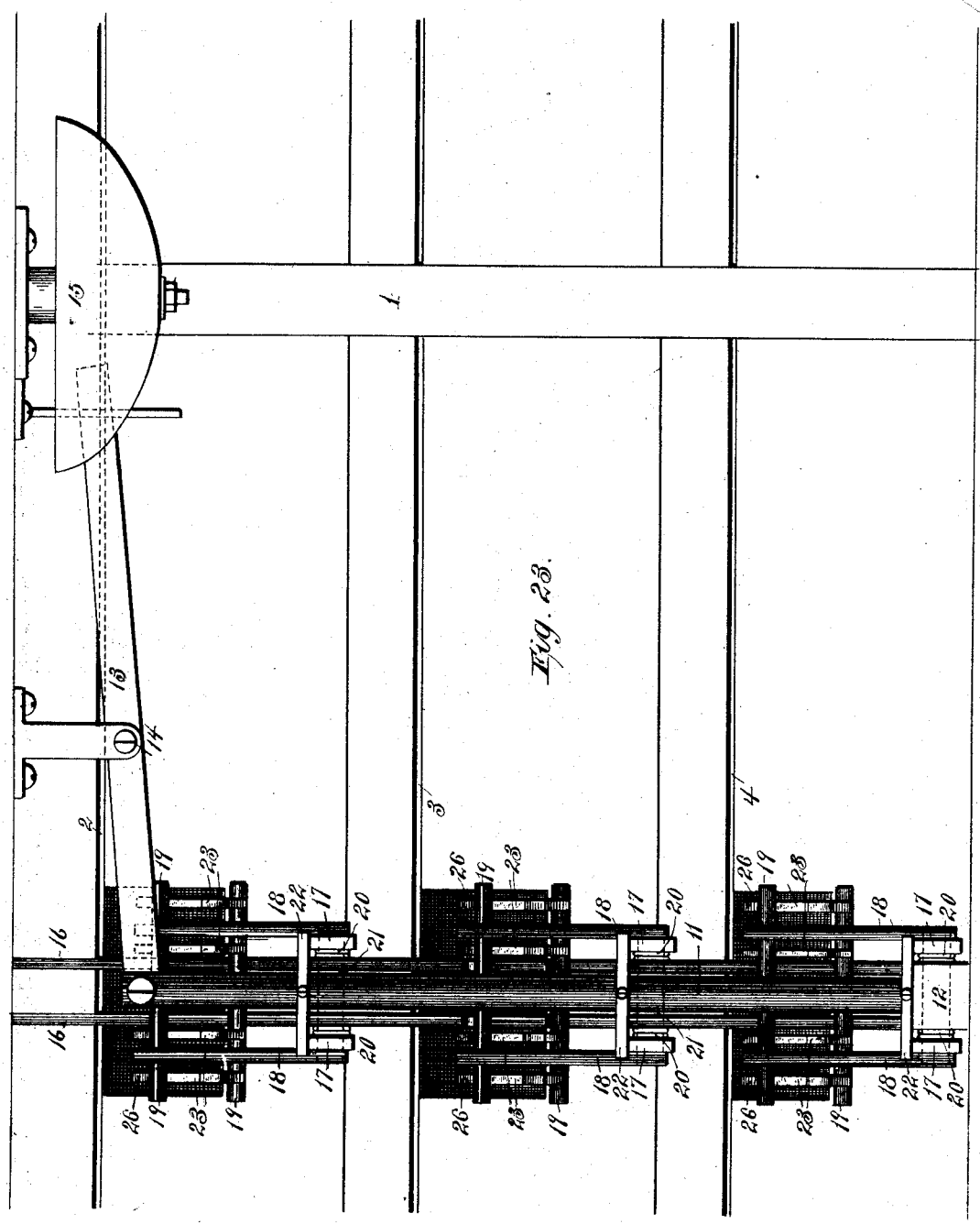

UNITED STATES PATENT OFFICE.

GEORGE B. PETERS AND EDWIN R. PETERS, OF EMPORIA, KANSAS.

MANUAL RECORDER.

SPECIFICATION forming part of Letters Patent No. 506,720, dated October 17, 1893.

Application filed May 21, 1892. Serial No. 433,912. (No model.)

*To all whom it may concern:*

Be it known that we, GEORGE B. PETERS and EDWIN R. PETERS, of Emporia, county of Lyon, and State of Kansas, have invented certain new and useful Improvements in Cash-Recording Apparatus, of which the following is a specification, reference being had to the accompanying drawings.

Our invention relates to a recording apparatus in which the records and deposits of each clerk or salesman are kept separate. When he makes a sale each salesman is to make a record of cash received upon a slip of paper, a portion of which is exposed for the purpose. Then when he pulls out his cash drawer to deposit the amount received, the movement of the drawer turns the recording mechanism and record made half way round, so that the purchaser can see that the amount paid is correctly recorded. We provide a plurality of such drawers and suitable connecting mechanism, so that the records and deposits of each clerk may be kept by themselves, and each salesman can be made ac-countable for all his transactions.

The object of our invention is to produce a simple, compact, and reliable cash receiving and recording apparatus of the nature indicated. To this end we provide a peculiar case or frame, in which we place several different drawers, each entering from what we will call the front side, and, several different recorders upon what we will call the rear side; although these recorders might be placed at the right or left side of the case, or in any other convenient position.

The essential features of our peculiar case or frame—which is an important element, and really at the foundation of our invention—are a plurality of drawer openings, a recess for recording mechanism, and openings through the case, whereby the amounts recorded can be separately observed. It is necessary also that the case be provided with a door to give access to the recorders, and with means for closing it securely to prevent tampering with the record. By having separate drawers, and a recorder connected with, and capable of being operated as below described by the movement of each of the drawers, and by having each drawer locked by mechanism which is only understood, and can only be operated by one particular salesman, we provide means whereby a record of the transactions of each salesman will be made subject to inspection of purchasers and others, and will be kept securely separate from the transactions of every other salesman by different parts of the same compact integral apparatus, which is an exceedingly important matter. By our invention we connect each of the drawers with a separate recorder. Where a different recorder is provided, in connection with each different drawer, which is the plan we generally prefer, it is necessary to have a special connecting mechanism between the drawers and the recorders, and between the different recorders, whereby the opening of any given drawer will cause a half rotation of any recorder mechanism that is turned to the rear for inspection of the record by a customer. It is desirable that a rotary part working in an opening in the case shall be covered, and that the parts exposed shall be fixed, because if the outside plate or disk be rotary it is constantly liable to be handled and it may get clogged by material getting between the rotary part and the fixed part.

Another advantage of having a cover or fixed part for the recording mechanism proper is that after the record is made by a salesman and the drawer is operated, the figures will immediately be turned under the fixed part where they cannot be again reached by the salesman, and therefore cannot be changed. Accordingly, instead of providing a rotary disk with an opening through it for writing figures upon the movable strip of paper, we make use of a fixed glass or other transparent cover which, with its support, always remain fixed with respect to the case and the recording mechanism. We prefer to have the fixed cover and glass project a little out of the case like a turret, because the recorded figures are then brought more conspicuously to the attention of the purchaser. By having a case, such as we provide, it becomes practicable to have a plurality of drawers in position, one over another, so that vertical space is economized, and it is also practicable, while this economy is secured, to connect each drawer with a separate recording mechanism located in a small recess behind the drawers.

Another advantage of our construction is that we locate the recording slip to be written upon at the rear of the case, so as to give the clerk a desk surface to be used in writing, and so as to bring the recorded figures near to the purchaser where he can observe them.

Figure 2:
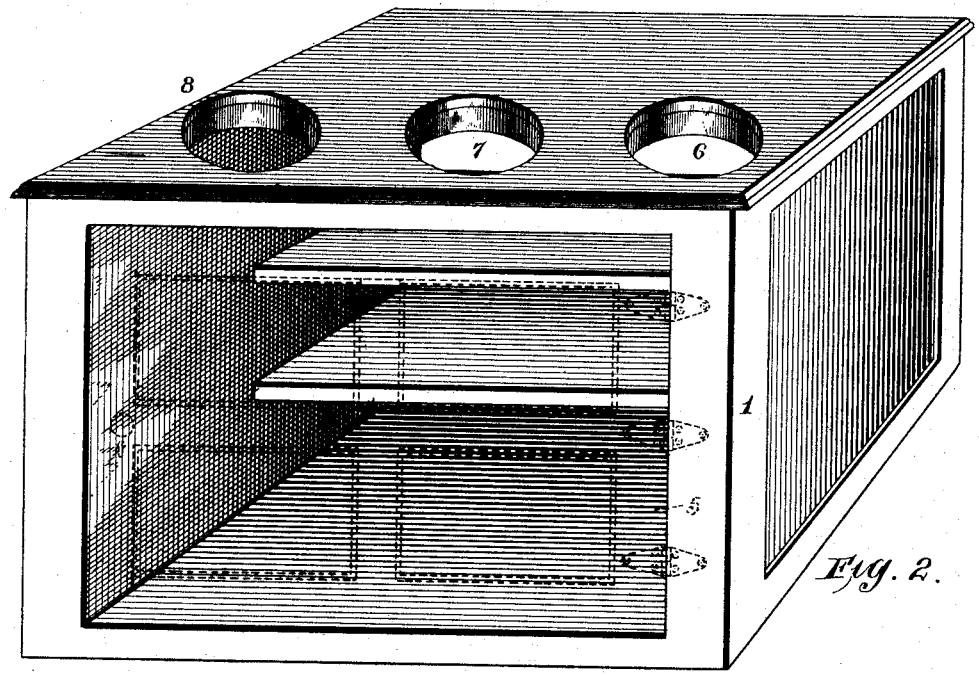
Figure 3:
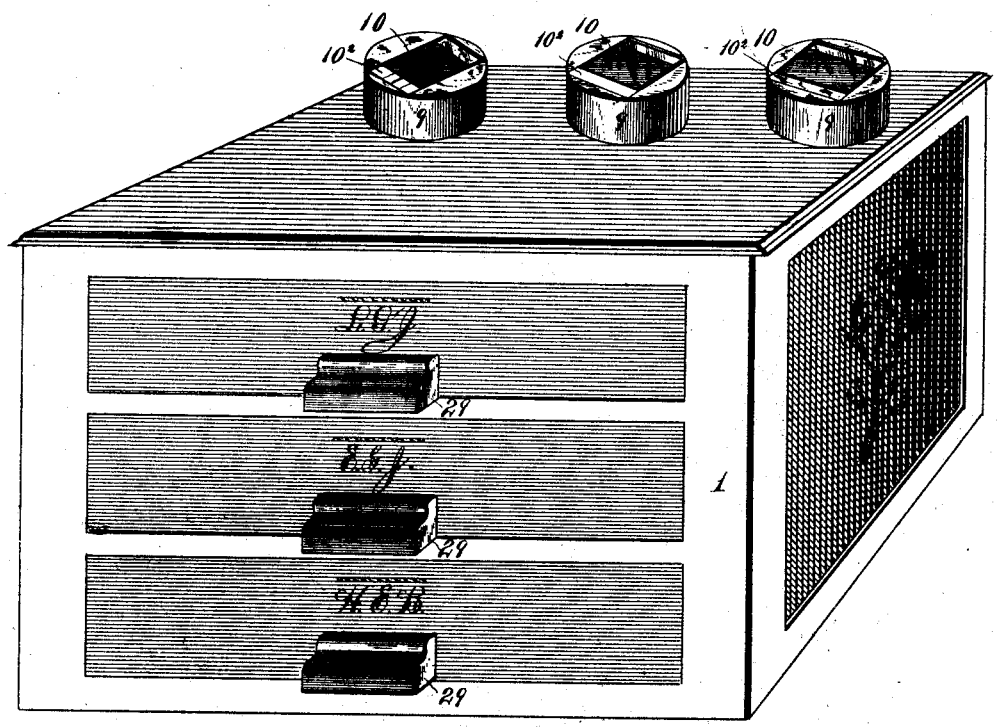
Figure 10:
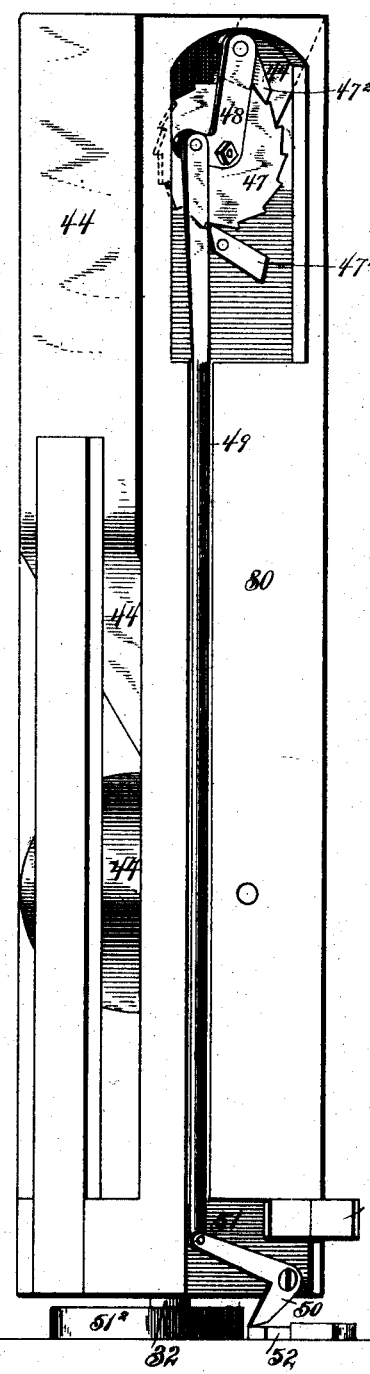
Figure 9:
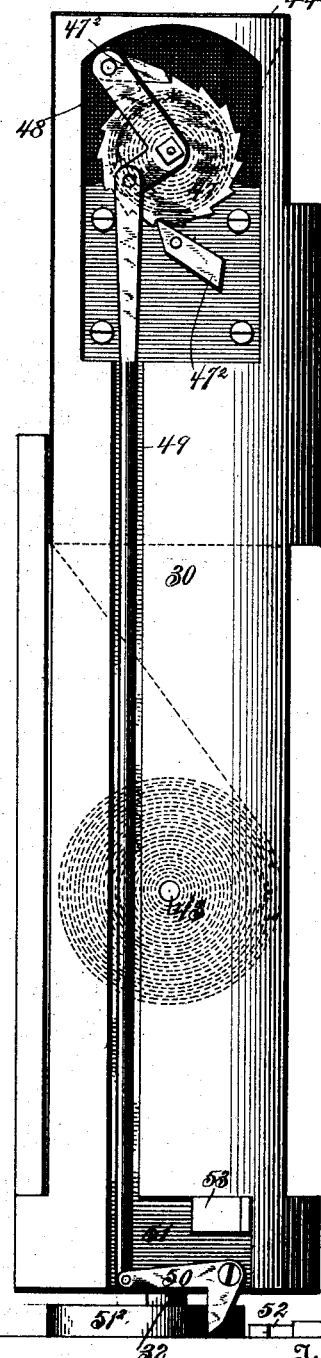
Figure 11:
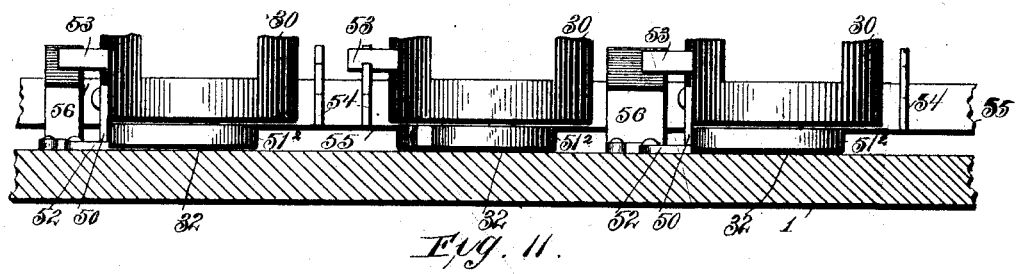
Figure 15:
Figure 16:
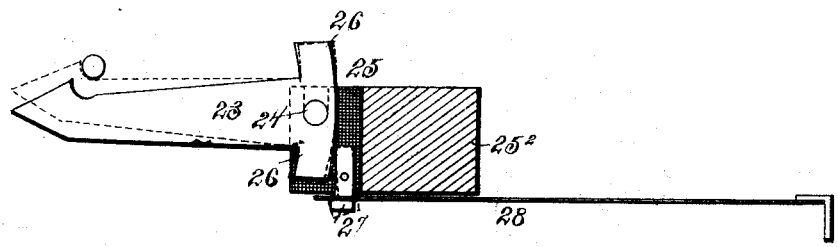
Figure 12:
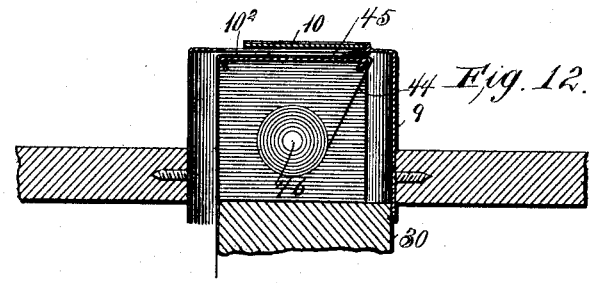
Figure 13:
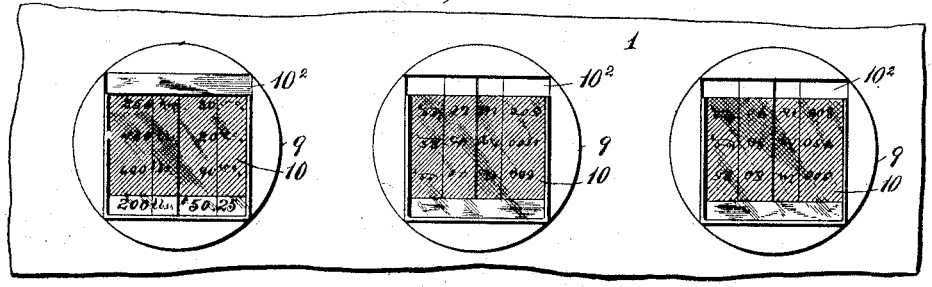
Figure 14:
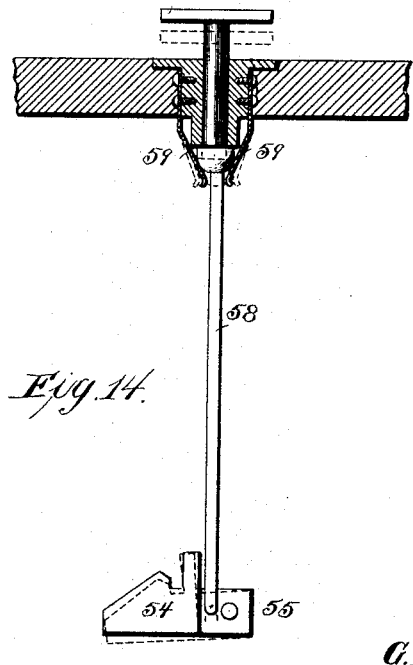

In the drawings—Figure 1 is a perspective view of our peculiar case or frame, as seen from the front. Fig. 2 is a perspective view of the case, as seen from the rear, the dotted lines in this figure indicating a door for closing the recess for containing the recording apparatus. Fig. 3 is a perspective view of the complete apparatus, as seen from the front, the drawers being closed. Fig. 4 is a vertical cross section of the frame, showing three vertical revoluble cylinders in elevation. One of these cylinders on the left is shown in reverse position from the other two, and its cap or holder, which we call the fixed parts, are shown in central vertical section. Fig. 5 is a view in elevation of one end of a drawer closed in the case, and mechanism connecting it with one of the cylinders, whereby when the drawer is open the cylinder is revolved half around. Fig. 6 is a sectional view of one of the cylinders, taken on the line 6, 6, of Fig. 5, and showing in plan a part of the mechanism for connecting the cylinder with one of the drawers. Fig. 7 is a view similar to Fig. 5, but showing the drawer open. Fig. 8 is a plan view of a part of the mechanism for connecting the drawer with the cylinder. Fig. 9 is a view of one of the cylinders, detached, exhibiting the recording mechanism in the position it occupies when a drawer with which it is connected is closed. Fig. 10 is a view of the same cylinder, detached, showing the recording mechanism in the position it occupies when the drawer with which the cylinder is connected has been slightly pulled out. Fig. 11 is an elevation of the lower parts of three cylinders, the bottom of the case being shown in section. In this figure the central cylinder is shown in reverse position from the central cylinder illustrated in Fig. 4, and the cylinder on the left side is shown in reverse position from the cylinder on the left side of Fig. 4. Fig. 12 is a vertical section of the fixed parts which project out of the openings in the top and rear of the case, and serve to cover and protect the revoluble recording mechanism within them. These fixed parts constitute what we call a turret. This figure also shows a section of the upper part of the cylinder carrying recording mechanism, and a section of the top of the case. Fig. 13 is a plan view of a section of the top of the case, showing three turrets, the recording mechanism in one of them being in reverse position from that of the others. Fig. 14 is an elevation of a spring supported push-rod and thumb piece, the rod being connected at its lower end with a rock-shaft, as shown also at the left side of Fig. 4. Fig. 15 shows the rock-shaft in cross section, and a latch lug or projection secured to one side of it. Fig. 16 shows a section of a tumbler supporting block, and one of the tumblers pivoted to it, and also mechanism for connecting it with the front end of one of the drawers, so that it may be operated. Figs. 17, 18, 19, 20, 21, and 22 indicate the tumblers in the different relative positions they may occupy. Fig. 23 is a rear elevation of a series of drawers and alarm bell, tumbler mechanism, and mechanism for connecting the tumblers with the alarm bell. Fig. 24 is a detail view of spring latch 34 and its connection with the tape 36 by the lug 35.

Referring to the figures on the drawings, 1 indicates the case or frame of my device, of which in what we call the front part are openings 2, 3, 4, for instance, to receive suitable sliding drawers or tills of the ordinary kind. See Figs. 1, 2 and 3. The opposite side of what we call the rear of the frame is provided with a door 5 that is adapted to be locked securely, and the key kept in the possession of the proprietor, thereby preventing access to the mechanism on the part of any one interested to make a false record.

In the top of the rear of the case, are provided openings 6, 7, 8, over each of which in practice is firmly fixed a cap or cover 9 that preferably carries on its top a fixed glass or transparency 10.

$10^2$ indicates a space left between the top of the cover and the fixed transparency, through which a single line of figures may be entered upon material provided underneath for that purpose. See Fig. 13.

For securing the drawers in position within the case, suitable locking mechanism should be employed, and we have illustrated in the drawings a simple and convenient device for this purpose. It consists as usual of a part firmly secured to the case, and another part adapted to be locked thereto carried upon the drawers. See Fig. 23. As illustrated, the first part consists of a rod 11, which is vertically or longitudinally movable, being held at its lower end in a box or socket 12, and pivotally secured to a lever 13 that is pivoted to a fulcrum 14, and adapted, by the upward movement of the rod, to impinge against the bell 15 and sound it.

16 indicates standards extending from top to bottom of the case and firmly secured thereto. They pivotally carry at suitable intervals arms 17 which are in practice equal in number with the drawers in the case.

18 indicates uprights fixedly secured to the arms and joined together by parallel cross bars 19 separated from each other by short intervals. The effect of the combination of the bar and upright is to form a bell crank lever and their combination in pairs by the cross bars is to form a frame which may be called a bell crank lever frame. See Figs. 17, 18, 19, 20, 21, 22 and 23.

20 indicates a spring coiled about the pivot-pin 21 of each of the bell crank lever frames, and adapted to hold it in such a position that the arm shall be at right angles to the standards. At suitable intervals upon the vertically movable rod are fixed cross pieces 22, against which the arms 17, when elevated, impinge and tend to raise the rod.

It will be perceived from the foregoing description that when the bell crank lever frames are swung upon the pivot-pins 21 so as to elevate the outer ends of the arms, the rod 11 will be raised and the bell sounded. The foregoing description relating to this point covers that part of the locking mechanism which is fastened to the case.

Coming now to that part which is carried on each of the drawers, 23 indicates latches or hooks, which, by means of pins 24, are pivotally carried in suitable bearings on opposite sides of recesses 25 in the supporting block 25², as illustrated in Fig. 16 of the drawings. The number of latches may be increased or diminished at pleasure, but we prefer to use five. The pivoted ends of the latches are provided with projections 26 on opposite sides to form a sort of T-shaped head for the latch.

27 indicates a small lever pivoted in the recess in the end of the drawer, in which is located a latch, one of such levers being provided for each of the latches. It is adapted to swing against the adjacent projection on the end of the latch and lift the latch upon its pivot. This mechanism is illustrated in detail in Fig. 16 of the drawings.

28 indicates a connecting piece extending preferably underneath the drawer, fastened at one end to the small lever 27, and terminating in front of the drawer, preferably underneath the handle 29 in a catch, upon which pressure from the finger of a clerk or operator may impart motion to the small lever and lift the latch. In practice these latches, when the drawer is closed, engage with one or the other of the cross bars 19 carried upon the bell-crank lever frame. The latches are readily reversible in the recesses which carry them, and being formed exactly alike at their pivoted ends may be inserted with their hooked ends upward or downward, as illustrated in Figs. 17, 18, 19, 20, 21, and 22 of the drawings.

In practice the latches for each drawer are arranged in a predetermined order, some hooking upwardly and some hooking downwardly. If an operator does not understand the combination, or, in other words, does not know which latches hook upwardly and which downwardly, he will be unable to open the drawer. The opening of the drawer depends upon the manipulation of the connecting pieces through their outwardly projecting ends, so that all the latches shall be disengaged from the cross-bars and allowed to slip freely through the space between the bars. It will be further observed that if an operator attempts to open the drawer without having properly set the combination, an improperly set latch will catch upon either the upper or lower cross bar and a pull upon the drawer will elevate the free end of the arms of the bell-crank lever frame, lift the vertically-movable rod 11, and in the above described manner sound the bell, thereby giving notice to the proprietor that a mistake has been made, or a fraud is attempted. By means of changing the positions of the different catches a very great number of combinations may be made.

We will now proceed to describe the recording mechanism in detail. See Figs. 4, 5, 6, 7, 8, 9, 10, 11, 12. 30 indicates a revoluble support or cylinder, of which one for each drawer may be provided, and each one rotatable by the opening of its drawer. The mechanism for rotating the support in either case is substantially the same, and we will proceed to describe and support as a whole, having premised the substantial similarity of all the supports. Each of the supports or cylinders is revoluble in bearings in the upper and lower part of the case, one of the apertures 6, 7, 8, in the upper part of the case being a sufficient bearing for it at that part, and a bearing 32 being provided for it in the bottom of the case. 33 indicates a projecting rod or arm extending preferably toward the rear of the case from the rear end of one of the drawers. It is provided on its projecting end with a spring latch 34, adapted to engage with a projection 35 secured at the free end of a metallic tape 36 that is secured at its opposite end to the side of the cylinder—see Figs. 5, 6, 7, and 8 of the drawings. 37 indicates a bracket which supports a grooved way or track 38 in position to guide the end of the projecting rod and the tape. Its groove or aperture 39 allows free play and engagement of the projection on the end of the tape, and the spring latch on the end of the projecting arm. The cylinder may occupy two positions, one in which the tape is extended through the track, as illustrated in Fig. 7 of the drawings, and another in which it is partially wound around the cylinder, as illustrated in Fig. 5. The former shows the position of the parts after the latch upon the end of the projecting arm and the projection upon the tape have come into engagement with each other, and the drawer has been pulled out. When the cylinder has been properly rotated the spring latch is preferably disengaged, so that the drawer may be completely withdrawn from its opening and the parts separated from one another. For this purpose I prefer to employ a head 41 on the top of the spring latch, and an inclined projection 42 in the path of its travel on the side extending from the side of the track 38. It will be perceived that the head rising upon the inclined surface of this projection will release the spring catch from the projection upon the tape. When the drawer is reinserted the spring latch rides easily over the projection on the tape and the parts again engage, as will appear from the following description. The relative position of the parts, when such engagement takes place is illustrated in Fig. 5 of the drawings, because the cylinder is regularly tripped and restored to the position therein illustrated after each rotation by the pulling out of a drawer. The cylinder is hollow and carries a roll 43 around which is wound a continuous strip of paper, which is indicated by the figure 44 in the drawings. The end of this strip of paper is carried upwardly over the tablet 45, and to a take-up pulley 46 preferably carried in suitable bearings within the cylinder underneath the tablet. This roll should be suitably adapted to rotate and wind up a certain amount of paper each time a drawer is opened. For that purpose we have illustrated a suitable form of mechanism which consists of a ratchet-wheel 47 on the end of the take-up pulley, and a pair of pawls $47^2$ located so as to effect the proper movement of the take-up pulley each time the drawer is operated. The upper pawl is preferably carried by a bell-crank lever 48 pivoted upon the journal of the take-up pulley. To the lower arm of the bell crank lever is pivoted a rod 49 that extends downwardly in a groove to the lower end of the cylinder, where it is pivoted to a trip latch 50 that may be made in the form of a bell-crank lever, as illustrated in the drawings, pivoted at its angle in a suitable recess 51 in the cylinder. 52 indicates a projection at the bottom of the case, located in the path of the trip latch, and adapted to raise it, as illustrated in Fig. 10 of the drawings, when it is brought in contact therewith by the rotation of the cylinder, and thereby to impart the requisite movement to the take-up pulley.

It will be perceived from the mechanism just described, in connection with the mechanism for rotating the cylinder by the pulling out of a drawer, that each time the drawer is pulled out the cylinder will be turned a half revolution, and in turning the projection 50 will operate the trip latch and impart motion to the take-up pulley, thereby moving the strip of paper a certain distance over the face of the tablet. This tablet in practice comes directly underneath the fixed transparency in the top of the cap 9, and the space over which it moves in each operation of the take-up pulley is equal to, or a little greater than the space exposed through the slot $10^2$ in the top of the cap. Each time a drawer is opened the individual cylinder, will be turned half way round, and the paper carried forward a predetermined distance.

To make clear the design and purpose of this operation thus far, we will describe the practical operation of the device up to this point. Suppose that the recorder is closed, as illustrated in Fig. 3 of the drawings, and that a clerk has made a sale and is about to record the same, the cylinder being in the position illustrated in Fig. 5 of the drawings, its face exposed as illustrated in Fig. 3 of the drawings, he records manually the amount of the sale upon the paper strip that is exposed through the slot in the fixed cap. Next he operates the combination and pulls out the drawer. This operation, as above explained, revolves the cylinder half way round, so that the figures the clerk has written are turned to the customer for his examination. As soon as the drawer has fairly begun to open, and before access to its contents is gained, the mechanism above described operates the take-up pulley and carries the figures the clerk has written underneath the glass out of his reach. By this means a record of each transaction is made, exposed for convenient inspection to the customer who is interested in the transaction; and, before the cash in the drawer can be reached, is removed from all access by the clerk. It is also clear that if the clerk fails to record a transaction a blank space will be left in his record which he must account for. Each clerk is in practice assigned a separate drawer, and to him alone is communicated the combination by which it is opened. If therefore a number of cylinders corresponding with the drawers is employed each clerk has his own record separate and complete, and if there is a shortage of any sort made he must account for the same. For this reason we prefer the combination of a plurality of drawers and an independent separate recorder for each drawer, because it attaches an error to a particular person and makes him solely responsible therefor. It will be perceived, however, that a cylinder operated by the mechanism above described will be left in the position last mentioned, namely, with the figures turned away from the clerk. In order, therefore, that it may be restored to the proper position for the next entry, we provide suitable tripping mechanism by which, upon the opening of one drawer, and the rotation of its cylinder every other cylinder is restored to the position for making an entry. For this purpose we may use a spring $51^2$ fastened at one end to the case, and at the other to the lower journal of the cylinder preferably, and adapted to rotate the cylinder in opposition to the force of a pull upon it by a drawer. 53 indicates a projection extending from one side of the cylinder, and adapted to engage with a beveled projection or catch 54 carried upon a rock-shaft or trip bar 55 that is pivoted in opposite sides of the case. The trip bar is held in position by spring 57 see Fig. 15 so as to keep the catch always in the upright position. When the cylinder is rotated so that the projection on its side comes in contact with the projection on the trip bar, the former will ride upon the beveled face of the latter and depress the trip-bar until it latches behind the catch thereon. It will be held in this position until released, when the cylinder will be rotated by its spring into the reverse position. To receive the shock of the spring in reversing the cylinder we provide a cushion standard 56, projecting from the case in the path of the projection upon the cylinder.

It will be perceived, by an examination of Fig. 4 of the drawings, that each time one cylinder is revolved so as to latch it to the trip-bar, it will necessarily depress the trip-bar and release every other cylinder that had been previously latched thereto. For the purpose, however, of releasing the cylinders independently, we provide a push-rod 58 extending through a suitable bearing in the case provided with springs 59 for keeping the rod in the elevated position, as illustrated in Fig. 14 of the drawings, and pivotally connected at its lower end to the trip-bar, so that a pressure upon the top of the push-rod will actuate the trip-bar in the same manner in which the rotation of a cylinder, as above described, would do it.

We claim—

1. A cash recorder, case, or frame having a plurality of drawer openings through the front wall thereof, one above another, a recess in the case for recording mechanism, at the rear of the drawer openings, means for opening and closing said recess, and an opening in the top of the case through which the record may be viewed, substantially as set forth.

2. In a cash recorder, the combination with a case or frame, of a plurality of drawers, a plurality of recording mechanisms capable of inspection from the outside of the case, and mechanism connecting the drawers operatively with the recording mechanisms, whereby the opening of either drawer will partly rotate the recording mechanism directly connected with it and no other, and the closing of the drawer will not affect the recording mechanism, substantially as set forth.

3. In a cash recorder, the combination with a case or frame, of a drawer, and recording mechanism comprising a revoluble support for carrying feed and take-up mechanism, and a fixed glass or transparency and its fixed support, whereby the recording mechanism can be viewed, substantially as set forth.

4. In a cash recorder, the combination with a case or frame, of a series of drawers, a series of revoluble recording mechanisms with their supports connected respectively with the drawers, and mechanism connecting these supports with each other, whereby the opening of a drawer will operate to partially rotate its corresponding recording mechanism to the rear, and will rotate any other recording mechanism that may be turned to the rear back to the front, substantially as set forth.

5. In a cash recorder, the combination of a case or frame, of a drawer, a recording mechanism, mechanism connecting the drawer with the recording mechanism, whereby when the drawer is pulled out the recording mechanism will be partly rotated, and a power, and trip mechanism, for rotating the recording mechanism back to its original position, substantially as set forth.

6. In a cash recorder the combination with a case, a drawer, a revoluble support, of a projecting arm upon the drawer, a guide upon the support, and a flexible connection between the arm and the support, substantially as set forth.

7. The combination with a case, a drawer, and revoluble support or cylinder, of a projecting arm having a spring latch on its outer end, a way supported upon the case, and having at its end nearer the drawer inclined sides adapted to engage with and operate the spring-latch upon the projecting arm, and a flexible band attached at one end to the cylinder and adapted to engage with the spring-latch of the projecting arm at its other end, substantially as and for the purpose specified.

8. In a cash recorder, the combination of the case, a drawer, and revoluble recording cylinder or support, of mechanism upon the drawer adapted to engage with corresponding mechanism upon the cylinder for rotating the same when the drawer is closed, and to become automatically disengaged therefrom when the drawer is pulled out, substantially as and for the purpose specified.

9. In a cash recorder, the combination with the case and a plurality of revoluble spring-actuated cylinders or supports, a movable spring-actuated trip-bar, mechanism for latching each of the cylinders to the trip-bar, and mechanism for operating the trip-bar to unlatch the cylinders, substantially as set forth.

In testimony of all which we have hereunto subscribed our names.

GEORGE B. PETERS.
    EDWIN R. PETERS.

Witnesses:
 WM. ELSTUN,
 T. P. BURNS.